(12) United States Patent
Marrelli et al.

(10) Patent No.: US 9,460,171 B2
(45) Date of Patent: Oct. 4, 2016

(54) PROCESSING DATA IN DATA MIGRATION

(71) Applicant: International Business Machines Corporation, Armonk, NY (US)

(72) Inventors: Carl M. Marrelli, Westerville, OH (US); Ram S. Narayanan, Canton, MI (US); Martin Oberhofer, Bondorf (DE); Solmaz Rashidi, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 14/074,996

(22) Filed: Nov. 8, 2013

(65) Prior Publication Data

US 2015/0134589 A1    May 14, 2015

(51) Int. Cl.
*G06F 7/00* (2006.01)
*G06F 17/00* (2006.01)
*G06F 17/30* (2006.01)

(52) U.S. Cl.
CPC ... *G06F 17/30563* (2013.01); *G06F 17/30569* (2013.01)

(58) Field of Classification Search
CPC ............... G06F 17/30563; G06F 17/30569
See application file for complete search history.

(56) References Cited

U.S. PATENT DOCUMENTS

| | | | |
|---|---|---|---|
| 7,760,405 B2 | 7/2010 | Ricard | |
| 2004/0205727 A1* | 10/2004 | Sit | G06F 11/3664 717/125 |
| 2008/0255895 A1* | 10/2008 | Rajamony | G06Q 10/06313 705/7.23 |
| 2009/0059305 A1 | 3/2009 | Ricard | |
| 2010/0318200 A1 | 12/2010 | Foslien et al. | |
| 2012/0078674 A1* | 3/2012 | Goel | G06Q 10/06 705/7.15 |
| 2012/0197681 A1 | 8/2012 | Marrelli et al. | |
| 2012/0265726 A1* | 10/2012 | Padmanabhan | G06F 17/303 707/602 |
| 2012/0304095 A1 | 11/2012 | Dennis | |
| 2012/0330911 A1* | 12/2012 | Gruenheid | G06F 17/30303 707/694 |
| 2013/0013967 A1 | 1/2013 | Gokhale et al. | |
| 2013/0024760 A1 | 1/2013 | Vogel et al. | |
| 2013/0083920 A1 | 4/2013 | Shirai et al. | |
| 2013/0325788 A1* | 12/2013 | Brown | G06F 17/30563 707/602 |
| 2014/0344211 A1* | 11/2014 | Allan | G06F 17/30563 707/602 |
| 2015/0046389 A1* | 2/2015 | Dhayapule | G06F 17/30563 707/602 |

OTHER PUBLICATIONS

Bryant, C., "Connecting Xcelsius Dashboards to External Data Sources using: An XML Data Button", Xcelsius Enterprise, Infommersion, Inc. Jan. 2005, pp. 1-12.

(Continued)

*Primary Examiner* — Loan T Nguyen
(74) *Attorney, Agent, or Firm* — Stephen Darrow; Matthew H. Chung

(57) ABSTRACT

A computer-implemented method for processing information related to an extract-transform-load (ETL) data migration, including aggregating operational metadata and determining: a plurality of metrics, organized by business object, corresponding to the migration; a number of business object instances not successfully loaded; a first end-to-end execution time for at least one business object; relevant input metadata; load readiness status per business object; impact of a business object that is not load ready by analyzing business process hierarchies; business object load readiness by reference to incomplete development status or data defects; scope per test cycle based, at least in part, upon business object load readiness; and high-priority defects of business objects that stop testing based, at least in part, upon analysis of business process hierarchies.

13 Claims, 10 Drawing Sheets

(56) References Cited

OTHER PUBLICATIONS

Densborn, F., "SAP Rapid Deployment Solutions: A better way to migrate your SAP data with Rapid Deployment Solutions", May 11, 2012, <http://scn.sap.com/community/rapid-deployment/blog/2012/05/11/a-better-way-to-migrate-your-sap-data-with-rapid-deployment-solutions>.

Densborn, F., "SAP Rapid Deployment Solutions: How to Visualize Data Migration Projects", Jun. 18, 2012, <http://scn.sap.com/community/rapid-deployment/blog/2012/06/18/how-to-visualize-data-migration-projects>.

"Data Conversion | Interface Integration = The Conversion Factory", Copyright the Conversion Factory 2010, <http://www.conversion-factory.com/dataconversionfactory/>.

"Data Migration Strategies, Part 1—Information Management Special Reports Article", DM Radio Sunday, Jun. 23, 2013, Cloud Compuing Exchange, Information Management, <http://www.information-management.com/specialreports/20040518/1003611-1.html?pg=2>.

"Equity Dashboard", Macroaxis, Copyright 2013 Macroaxis Inc., provided by Inventor Apr. 9, 2013, <http://www.macroaxis.com/invest/symbolDashboard/DATA MIGRATION>.

http://www.collabera.com/services/ppm_dashborad.html—Google Search, provided by Inventor on Apr. 26, 2013, <http://www.collabera.com/services/ppm_dashborad.html>.

"MinePoint—Executive Dashboard", DP Solutions, Inc., Comprehensive Business Solutions, provided by Inventor on Apr. 26, 2013, <http://www.dpsol.com/software/minepoint/minepoint-executive-dashboard/>.

"SAP ERP", Wikipedia, the free encyclopedia, page last modified on Jul. 29, 2013 at 05:10, <http://en.wikipedia.org/w/index.php?title=SAP_ERP&oldid=566243233>.

"Zenith Unveils Data Quality Dashboard at 2011 Asia Pacific Data Quality Congress", Mar. 28, 2011, 2011 Data Quality Asia Pacific Congress, held at Citigate Central Sydney, Australia 28 "" Mar. 30, 2011, <http://www.collabera.com/services/ppm_dashboard.html>.

* cited by examiner

PROCESSING DATA IN DATA MIGRATION

FIELD OF THE INVENTION

The present invention relates generally to the field of data migration, and more particularly to data migration that uses extract-transform-load (ETL) processes.

BACKGROUND OF THE INVENTION

For many large enterprise transformation efforts, migration of data from legacy systems to a future-state environment (that is, the target environment) is a critical project component, because having actual source data in the target environment is often a pre-requisite for productive integration testing of a new technology solution. This data migration effort is organized by use of constructs known as conversion objects. Each conversion object pulls data from one or more sources (for example, source databases). During data migration, the data corresponding to each conversion object is transformed based on "conversion rules" so that data which was in a suitable form and format for the old environment (that is, the source environment) will be transformed into a form and format suitable for the new target environment. After and/or during transformation, the transformed data is loaded into the target system (for example, one or more target databases).

Conversion objects are designed, developed, and tested in parallel. There are often dependencies between conversion objects. When conversion object A is dependent upon conversion object B then this means that conversion object A should be fully extracted, fully transformed and fully loaded before conversion object B is transformed and/or loaded.

Project managers often look to team leads for the status of each conversion object, dependencies between conversion objects, and/or impacts of incomplete objects. For smaller initiatives that do not have a dedicated data team, the additional responsibility of managing conversion objects often falls on the process team lead(s). Larger initiatives with a dedicated conversion manager may use multiple landscapes to support multiple testing scenarios or roll-outs, requiring the correct data be loaded into the correct environment at the correct time. These variables add to the complexity and risk of the data migration workstream. Organization, status, and progress tracking of all these moving parts is thus often times a challenge, which can lead to budget overruns from both a time and money standpoint.

Various workers typically play certain roles in a typical large data migration project. A data lead type worker: (i) tracks workload by resource and execution times by data object, identifies risk, accelerates performance where required, improves data quality, and provides leadership on technical activities for data conversions; and (ii) is responsible for the data team's adherence to the overall project plan, including design and development of data objects and associated testing (for smaller projects, these responsibilities may be shared across the process team leads as there may not be a dedicated data lead). A project manager type worker: (i) manages scope, cost, schedule, deliverables, project resources and communications plans; and (ii) provides day-to-day direction to the project team. A cutover lead type worker ensures the conversion effort fits into the cutover window, negotiates legacy system outages, and plans cutovers. A functional data analyst type worker: (i) "owns" one or more conversion objects from a functional standpoint and ensures communications between business and information technology groups; and (ii) is accountable for functional specification of the conversion and functional unit testing, and coordinates post-load validations. A developer type worker: (i) "owns" one or more conversion objects from a technical standpoint; and (ii) is accountable for technical specifications on ETL design and development of ETL code.

SAP ERP (herein sometimes simply referred to as "SAP") is SAP AG's Enterprise Resource Planning software. SAP incorporates the key business functions of an organization. SAP includes functionality in many areas, such as accounts payable, accounts receivable, accounting and financial reporting, risk management, regulatory compliance, and so on. SAP includes several modules, including: (i) utilities for marketing and sales; (ii) field service; (iii) product design and development; (iv) production and inventory control; (v) human resources; and (vi) finance and accounting. SAP obtains data from the various modules to provide the company or organization with enterprise resource planning capabilities. SAP can potentially be used by an enterprise to go from an older calculations system to a fully integrated software package. (Note: the term(s) "SAP", "SAP ERP" and/or "SAP ENTERPRISE RESOURCE PLANNING" may be subject to trademark rights in various jurisdictions throughout the world and are used here only in reference to the products or services properly denominated by the marks to the extent that such trademark rights may exist.)

SAP is used in this document as a non-limiting example of a data migration target system. Other non-limiting example targets include SAP CRM and systems from salesforce.com, among others. (Note: the term(s) "SAP CRM", "SAP CUSTOMER RELATIONSHIP MANAGEMENT", and/or "SALESFORCE.COM" may be subject to trademark rights in various jurisdictions throughout the world and are used here only in reference to the products or services properly denominated by the marks to the extent that such trademark rights may exist.)

SUMMARY

A first aspect of the present invention provides: aggregating, by one or more processors, operational metadata produced by an ETL data migration process, the operational metadata comprising at least one of: counts of data records in one or more areas along a path from a source to a target system in the ETL data migration process; run times for movement of data records from area to area; status of data record movement; or combinations thereof; determining, by one or more processors, a plurality of metrics, organized by business object, related to performing the ETL data migration, the business object being a hierarchical grouping of business process streams that interact with an enterprise resource management system; determining, by one or more processors, a number of instances of business objects not successfully loaded in the one or more areas along a path from a source to a target system during the ETL data migration; and determining, by one or more processors, a first end-to-end execution time for at least one business object, the end-to-end execution time comprising a project planned time for a first-time run and a previous actual time for a subsequent run.

A second aspect of the present invention provides: determining, by one or more processors, relevant input metadata for determining object dependency status by obtaining conversion object dependencies, aggregated run times for migrating conversion objects from area to area along a path from a source to a target system during an ETL data migration process, task completion statuses for conversion objects, and conversion object defect statuses; determining whether a business object is ready to load or not based, at least in part, upon at least one aggregation of the task and defect statuses; and determining a first impact of a first business object that is not load ready by analyzing business process hierarchies to determine relationships between and among business objects.

A third aspect of the present invention provides: determining a business object load readiness status based, at least in part, on incomplete development status or data defects; determining a scope per test cycle based, at least in part, upon business object load readiness; and determining high-priority defects of business objects that stop testing based, at least in part, upon analysis of business process hierarchies to determine an impact of a defect on one or more business objects, and score defect severity based on various metrics.

DETAILED DESCRIPTION

Figure 1:
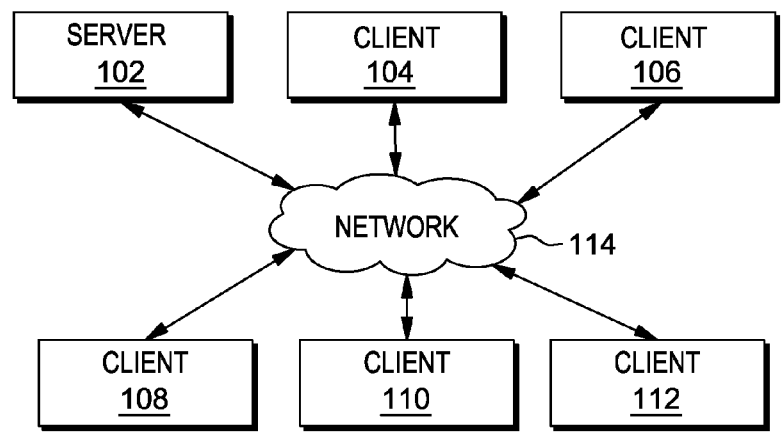
FIG. 1 illustrates a schematic view according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
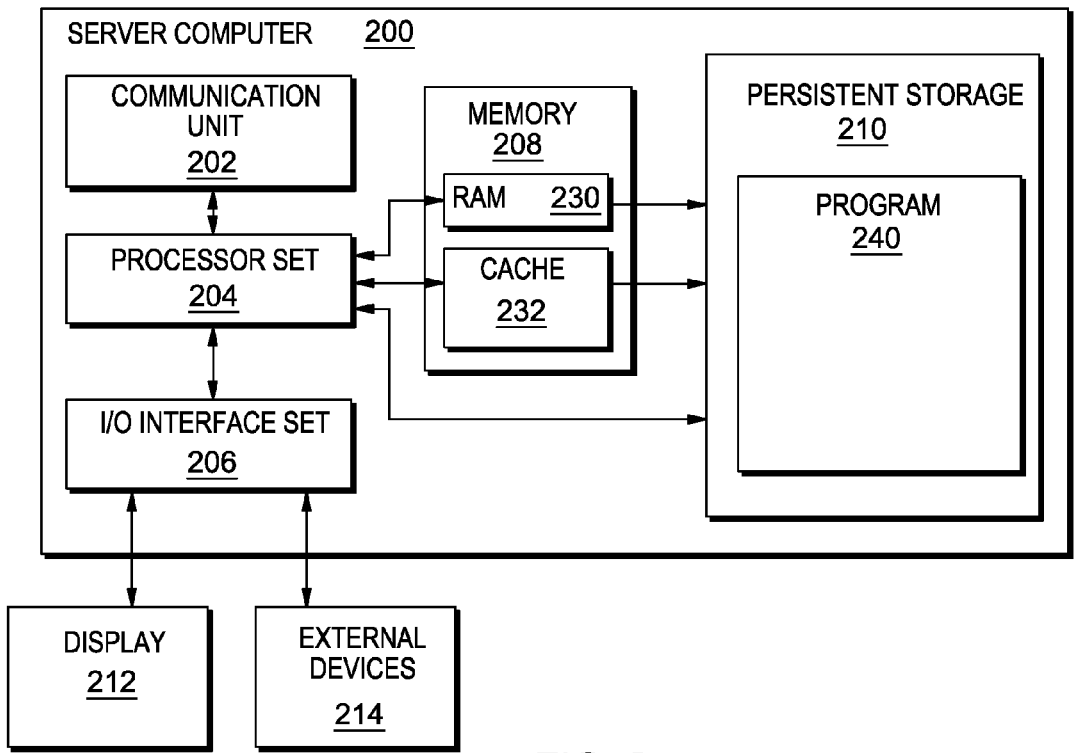
FIG. 2 illustrates a schematic view according to an embodiment of the present invention.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a collection of machine readable instructions and/or data that is used to create, manage and control certain software functions that will be discussed in detail, below, in the First Embodiment sub-section of this Detailed Description section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and do not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the program on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
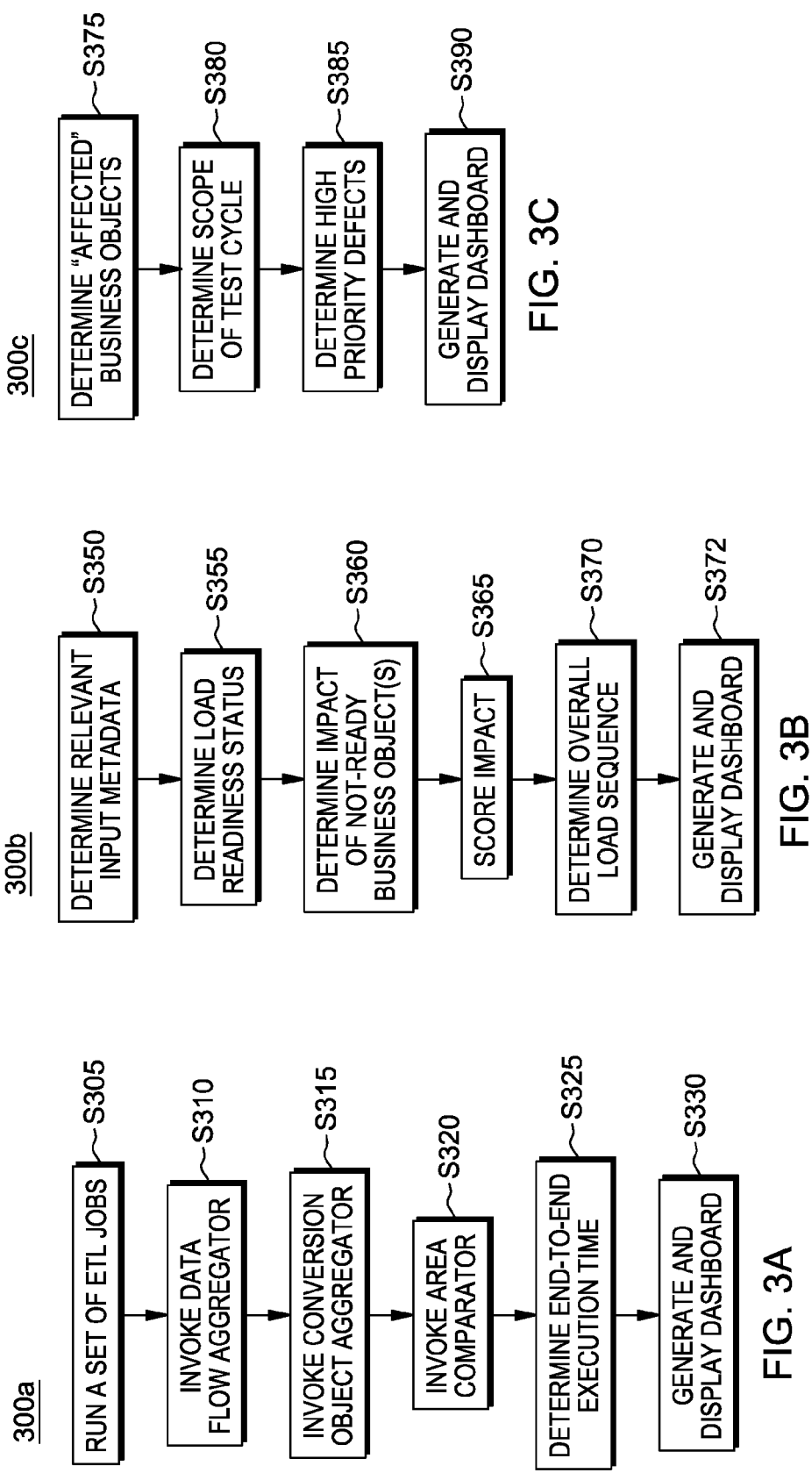
FIG. 3A illustrates a flowchart according to an embodiment of the present invention.
FIG. 3B illustrates a flowchart according to an embodiment of the present invention.
FIG. 3C illustrates a flowchart according to an embodiment of the present invention.
Figure 4:
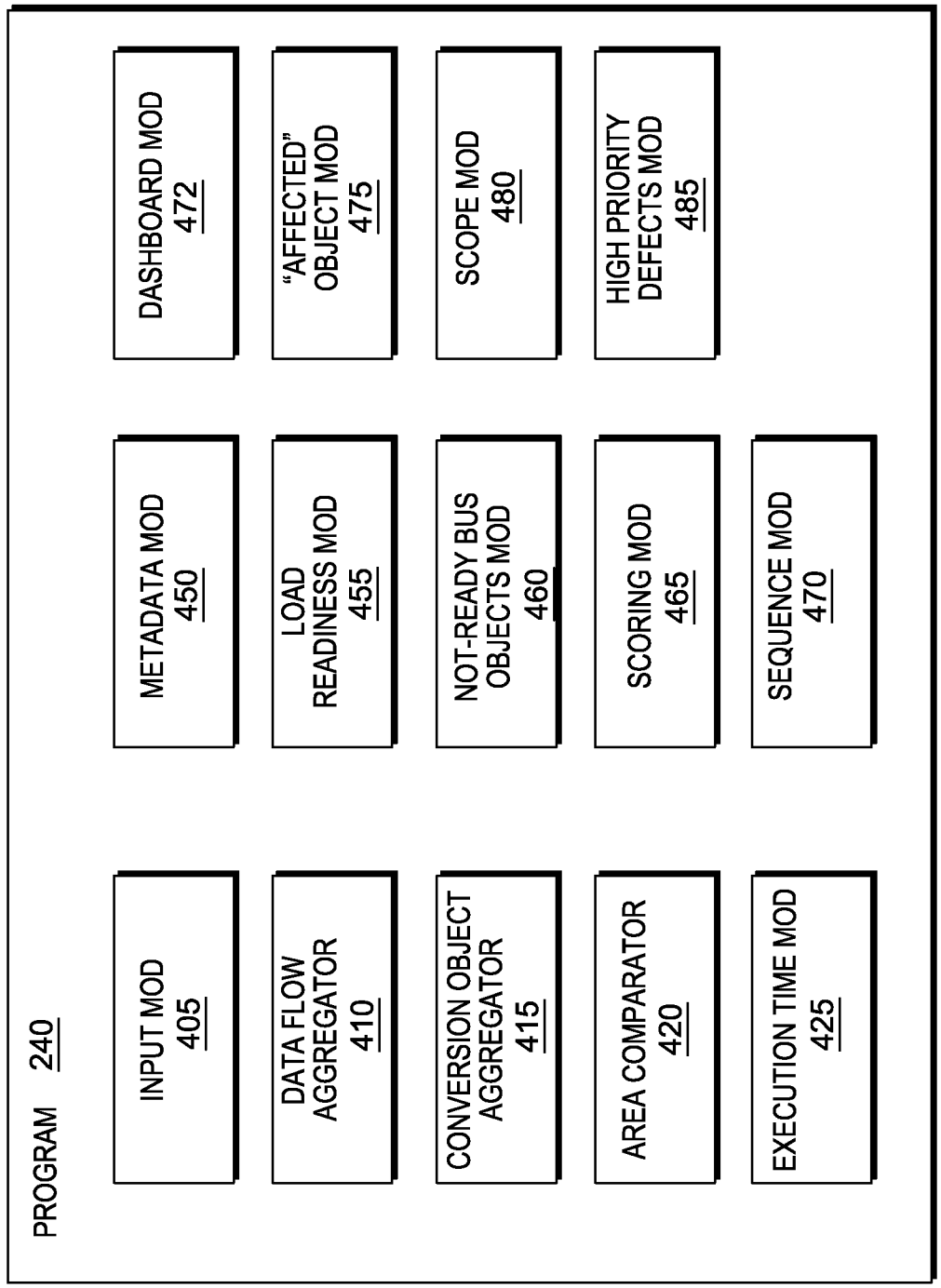
FIG. 4 illustrates a schematic view according to an embodiment of the present invention.

FIGS. 3A, B and C show three flowcharts 300a, b and c respectively depicting three different and separate methods according to embodiments of the present invention. FIG. 4 shows program 240 for performing at least some of the method steps of the three flowcharts 300a, b and c. Program 240 is divided into modules, each of which is present in persistent storage 210 (see FIG. 2) and each of which is responsible for one or more aspects of the methods presented in FIGS. 3A, B, and C. Those skilled in the art will recognize that other divisions of responsibility are possible, and that all modules need not reside in the same persistent storage unit or even on the same computer. The methods and associated software will now be discussed, over the course of the following paragraphs, with extensive reference to FIGS. 3A, B and C (for the method step blocks) and FIG. 4 (for the software blocks).

FIG. 3A presents flowchart 300a, illustrating a computer-implemented method to determine data movement status by business object by business process area by deployment phase for a data migration project. This method is sometimes referred to herein as a data movement status algorithm, and an embodiment of this method is described below. Another, more detailed embodiment of a similar data movement status determination method can be found below in the discussion of the embodiment of the present disclosure presented in FIGS. 5-9.

In step S305, a set of one or more extract-transform-load (ETL) jobs are run across a "middleware system." Middleware module (mod) 600, shown in FIGS. 5 and 6 and discussed in greater detail, below, is an example of such a middleware system. In the embodiment presented in FIGS. 1, 2, and 4, metadata from the middleware system and other sources is pulled for use by various components of program 240 by input module 405.

In step S310, data flow aggregator module 410 aggregates operational metadata produced by information integration ETL functions of the middleware and other systems. In this embodiment, this metadata includes counts of data records in various areas along a path from source system(s) to target system(s), as well as run times for movement of these records from area to area along that path.

In this embodiment, data flow aggregator module 410 also performs the following functions: (i) determines the number of accumulated record failures per table across all ETL functions; (ii) determines based on table relationships how many business object instances are affected by individual record failures; (iii) determines, if de-duplication is part of the process, the new, reduced number of business object instances which should be loaded by analyzing non-survivor results; (iv) determines, based on measured data quality key performance indicators, data defects on column, record, table and business object instance level through lineage and aggregation computations; and (v) determines by invoking area comparator 420 (discussed further below) how many records and business object instances cannot be moved between any two areas involved in the data migration process.

In step S315, conversion object aggregator module 415 determines various metrics by business object in the scope of the data conversion. In this first embodiment, these metrics include record counts by conversion object, and valid record counts and data defects by conversion object.

In step S320, area comparator module 420 determines if there is a difference between the number of business object instances successfully loaded and the number of business object instances which should have been successfully loaded across each stage in a data migration pathway.

In step S325, execution time module 425 determines the end-to-end execution time of the conversion by business object across all ETL functions. By determining this end-to-end execution time by conversion object for movement of data along the entire path from source system(s) to target system(s), anticipated load time per business object for future iterations of the transformation process can be projected.

In step S330, dashboard module 472 packages this information in a form suitable for display to a user. The information is then presented to the user via display 212 of server system 102 or a display of client system 104 as dictated by user convenience.

The embodiment of the data movement status algorithm presented in flowchart 300a performs the following functionality over the course of its execution: (i) it determines the total number of business object instances entering the data conversion process across all sources; (ii) it reduces this number appropriately by factoring in non-survivors and other filtered records; (iii) it determines the number of business object instances affected by data defects; (iv) it determines the average end-to-end processing time for each business object instance on the target from the business object instances which have been loaded during test runs; and (v) it determines the total end-to-end execution time for a conversion by projecting the total number of executions of each ETL function used over the total number of business object instances.

FIG. 3B presents flowchart 300b, illustrating a computer-implemented method to determine object dependency status by process domain and business object for a data migration project. This method is sometimes referred to herein as a data conversion object dependency planning algorithm, dependency planning algorithm, or data dependency algorithm, and a first embodiment of this method is described below. Another, more detailed embodiment of this method can be found below in the discussion of the embodiment of the present disclosure presented in FIGS. 5-9.

In step S350, metadata module 450 determines relevant input metadata by invoking data flow aggregator 410, a task tracker (not shown) and a defect tracker (not shown). The data flow aggregator was described above, in the context of the data movement status algorithm. The task tracker determines a status of each task for each conversion object, and assigns a weight to that status depending on factors such as task complexity and task type. The defect tracker tracks data defects and aggregates these by conversion object. A conversion object has multiple tasks associated with it: design tasks, development tasks and execution tasks. The object can also have one or more defects associated to it in the event it fails a unit or integration test.

In step S355, load readiness module 455 determines load readiness status per business object based on appropriate aggregations of relevant task and defect statuses as determined by the task and defect trackers, respectively, in the previous step.

In step S360, not-ready business objects module 460 determines the impact of any business object not load ready by analyzing the relationship of such business objects across the business process hierarchies per business process domain, since any business object might affect multiple business process areas.

In step S365, scoring module 465 scores the impact of each business object on the status of the overall migration effort depending on various metrics, such as the number of business processes affected and their size and importance.

In step S370, sequence module 470 determines an overall object load sequence based on conversion object dependencies, with contingency times based on size of business object, data volume and complexity.

In step S372, dashboard module 472 packages this information in a form suitable for display to a user. The information is then presented to the user via display 212 of server system 102 or a display of client system 104 as dictated by user convenience.

FIG. 3C presents flowchart 300c, summarizing a computer-implemented method to assist in test cycle planning by identifying missing data needed for test cycles (there are usually a large number of test cycles in complex projects). This method is sometimes referred to herein as a test script impact algorithm, and a first embodiment of this method is described below. Another, more detailed embodiment of this method can be found below in the discussion of the embodiment of the present disclosure presented in FIGS. 5-9.

In step S375, affected object module 475 determines the business objects affected by either incomplete development status or data defects.

In step S380, scope module 480 determines test cycle scope—that is, which conversion objects are to be included in the test cycle—based on business objects readiness metrics such as development status, test status, defect status, and the like.

In step S385, high-priority defects module 485 determines high priority defects of business objects that are impeding testing across multiple business process domains by analyzing all relevant defects in the context of the business process hierarchies associated with the data migration project.

In step S390, dashboard module 472 packages this information in a form suitable for display to a user. The information is then presented to the user via display 212 of server system 102 or a display of client system 104 as dictated by user convenience.

Some embodiments of the present disclosure may help deal with one, or more, of the following problems, issues and/or challenges: (i) a lack of linkages among the defect tracking tools, business process metadata, data models, and conversion object load sequence information; (ii) identification of which conversion objects are impacted by the ETL defects in the defect-tracking tool; (iii) identification of which other objects are impacted due to object dependencies (for example, Sales Orders can only be loaded into SAP if Customers and Products have already been loaded); (iv) identification of which test scripts and processes are impacted by a defect; (v) determination of how many instances of other business objects cannot be loaded (for example, if a defect is affecting only a subset of all instances of the business object); (vi) a lack of linkages among the project planning tool and operational and object-level metadata; (vii) identification of which are the long-pole (that is, relatively important and/or fundamental) conversions; (viii) identification of which conversions impact cutover outage windows; (ix) a lack of information integration, such as results on reports around de-duplication and the total number of records processed according to operational metadata across staging (STG), alignment (ALG), and preload (PLD) areas; (x) a lack of metadata integration, making useful information difficult to obtain; and/or (xi) understanding target data quality measures in terms of data quality by business process.

Some embodiments of the present disclosure recognize that the roles of the various types of workers involved in a data migration project can be grouped into three role buckets: (i) manager bucket; (ii) analyst bucket; and (iii) developer bucket. The manager bucket refers to resources with project management and planning functions for the data migration project. This includes the data and cut-over leads as well as the project manager. The analyst bucket refers to human resources who capture the data requirements by interacting with the process teams responsible for the business processes in the target system. These resources collaborate with the developers to define the functional specifications and appropriate source-to-target mappings. They are responsible for several activities and validation checks as data is migrated. They drive the data quality action plan based on the data quality issues discovered in the source system. The developer bucket refers to resources who design technical conversion specifications and develop data movement, cleansing, transformation, and load logic. They assist the analyst in data profiling activities to understand the data quality issues in the source system. Those workers in the developer and analyst buckets of roles have a strong influence on task definitions and their execution. This means items will typically be defined, executed, and reported on a fine-grained level by workers in these roles. However, manager bucket workers (or "resources") are interested in tracking project status, which means managers will often be the primary consumers of generated reports.

Some embodiments of the present disclosure recognize that when dealing with ETL data conversions, there are three types of relevant objects as follows: (i) data objects; (ii) conversion objects; and (iii) business objects. Data objects are groupings of data tables and fields that represent a logical entity in a business system, such as an enterprise resource planning (ERP) system. Data objects can be classified as master data (slow to change, fairly static) and transaction data (often changes with each transaction of the system). Examples of data objects are Customer Master, Material Master, and Sales Orders. Conversion objects are subsets of data objects, organized in such a way that is convenient to move the data from a source system to a target system. For example, the Customer Master object may be divided into Customer Master Basic, and Customer Master Sales conversion objects. A business object is a grouping of business process streams that interact with an ERP system. These are generally hierarchical in nature, with level one representing process streams, such as Order to Cash, Procure to Pay, and so on.

Some embodiments of the present disclosure may provide one, or more, of the following benefits to manager bucket resources: (i) a holistic view of the conversion effort, and the ability to act and plan for contingency if any piece of the program is off track; (ii) a complete view of a conversion object, including development/execution/defect status, run-time operational metadata, data volume moved through middleware and converted, and accountable resources and interdependencies with other objects; (iii) the ability to re-swivel the view by resource to perform workload analysis for each phase of the conversion effort; and (iv) the ability to perform contingency actions if any object or activity is delayed or defective.

Some embodiments of the present disclosure may provide one, or more, of the following benefits to developer and analyst bucket resources: (i) a single view for all aspects of conversions for which the developer or analyst is accountable; (ii) visibility into the status of the design and development effort for each object, defect statuses, and due dates; (iii) current run-time workflow views of where each object is in the conversion process, as well as alerts when manual steps are required; (iv) operational metadata such as run times and data volume to enable optimized conversion validation; (v) access to reporting metadata through a single interface for conversion reports and validations, allowing easier collaboration with business owner counterparts; and (vi) a single source of truth for conversion specifications and reports.

Some embodiments of the present disclosure provide software that generates and controls a user interface herein called a "data conversion dashboard." In some embodiments, the data conversion dashboard has one, or more, of the following features, advantages and/or characteristics: (i) exploits operational metadata linked end-to-end to technical metadata via the use of aggregators; (ii) computes, by aggregators, the project status at various degrees of abstraction through a pluggable architecture; (iii) provides early warning indicators if the data-related activities are not on time or are behind in quality targets; (iv) provides a single-source portal for all data-related items; and/or (v) provides project leaders with the information required to manage effectively and make better decisions.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

As shown in FIGS. 5-9, data conversion dashboard system 500 is an exemplary embodiment of the present disclosure and includes: conversion module ("mod") 502; information pullers mod 504; first communication path 505; dashboard mod 506; second communication path 507; conversion user interface (UI) mod 508; conversion manager type worker 510; developer/data analyst type worker 512; adapters 514a to 514n; middleware mod 600; third communication paths 515; project plan mod 516; and defect tracking mod 518.

Figure 5:
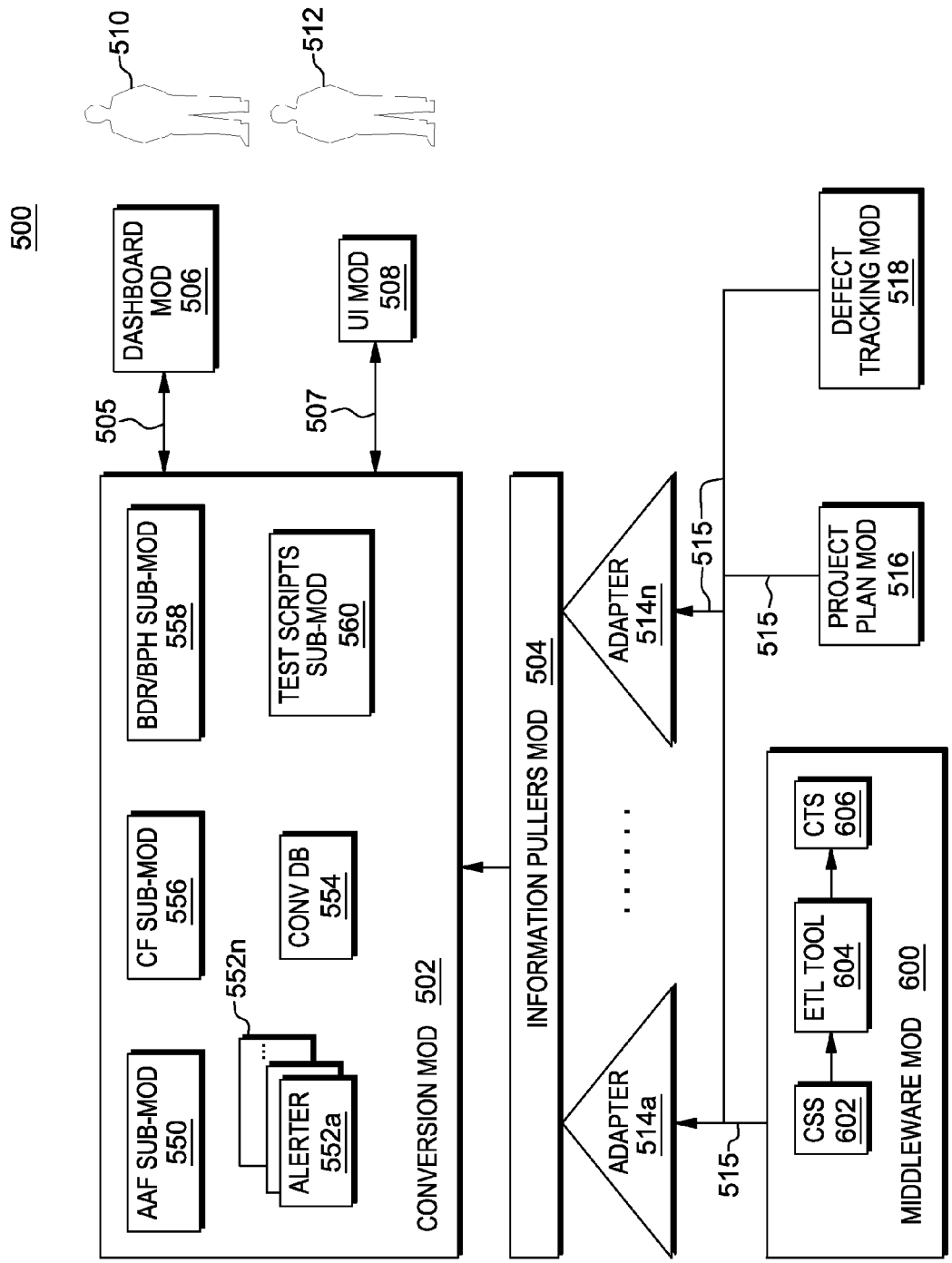
FIG. 5 illustrates a schematic view according to an embodiment of the present invention.

As shown in FIG. 5, conversion mod 502 includes: algorithmic aggregators framework sub-mod 550; alerters 552a to 552n; conversion database 554; configurator framework sub-mod 556; business data roadmap/business data hierarchy (BDR/BPH) sub-mod 558; and test scripts sub-mod 560.

Figure 6:
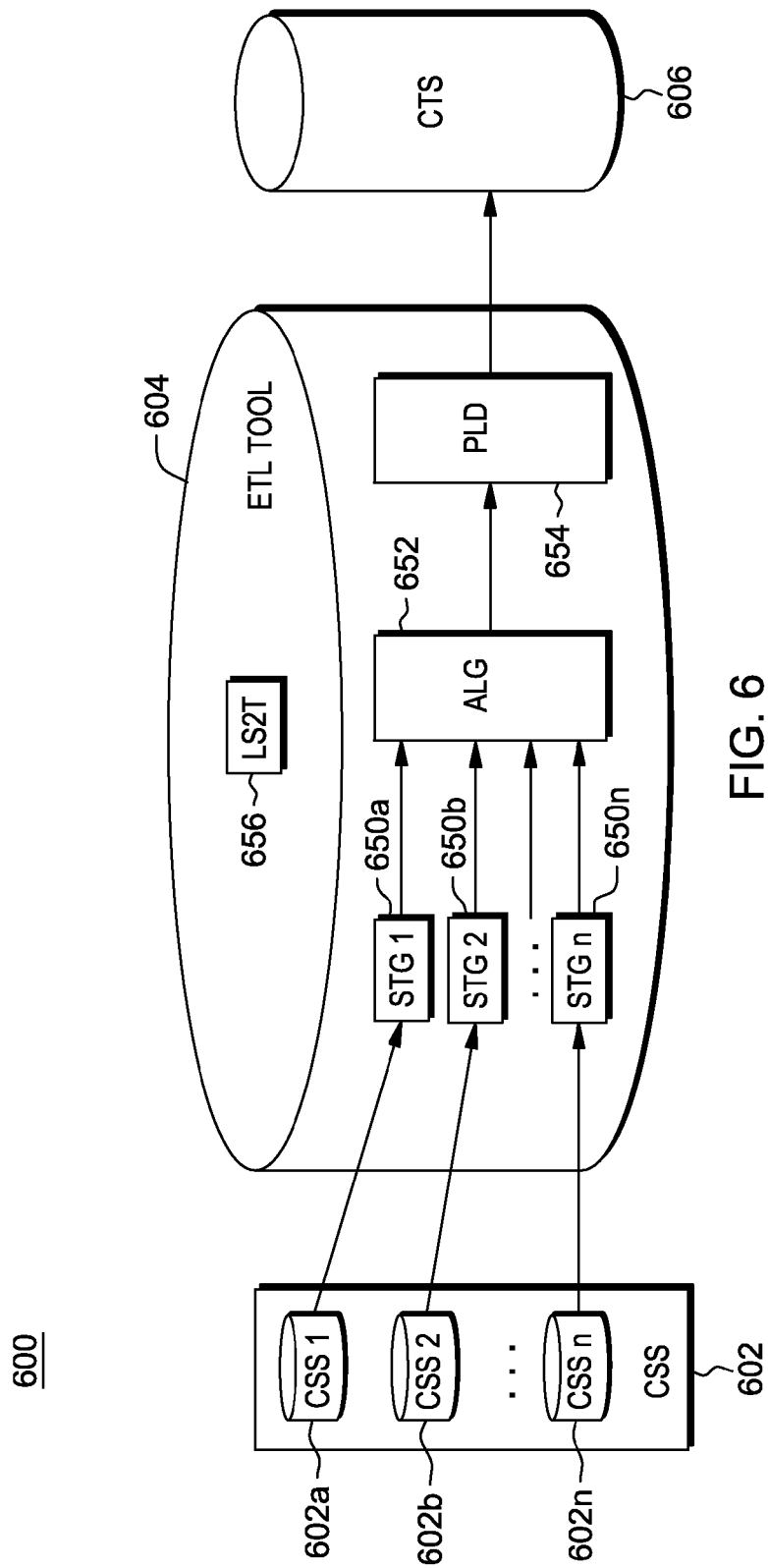
FIG. 6 illustrates a schematic view according to an embodiment of the present invention.

As shown in FIG. 6, middleware mod 600 includes: conversion source systems 602, specifically conversion source systems 602a to 602n; ETL tool 604 (including staging areas (STG) 650a to n, alignment area (ALG) 652, preload area (PLD) 654, and logical source-to-target (LS2T) mapping 656); and conversion target system 606.

Figure 7:
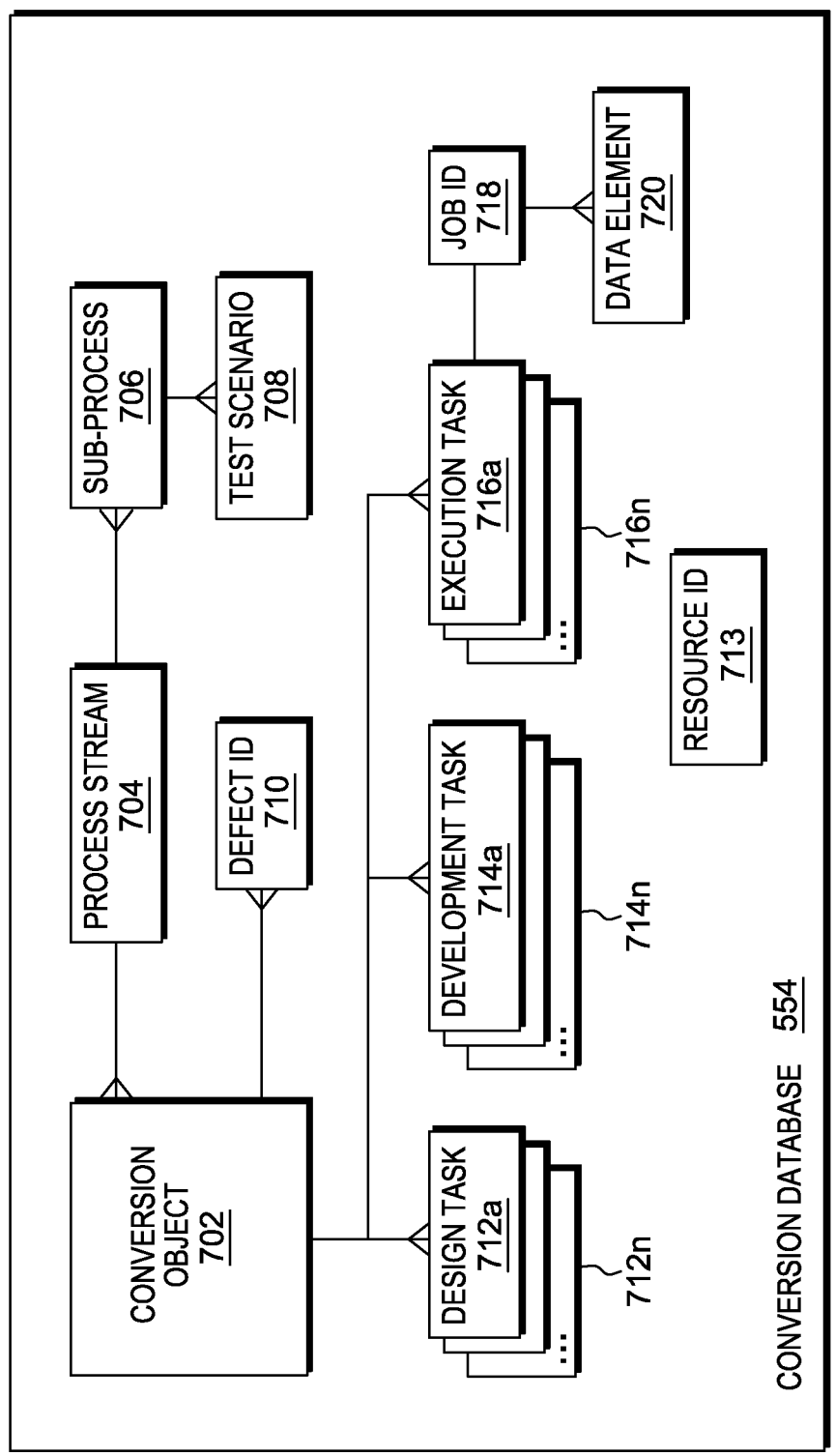
FIG. 7 illustrates a schematic view according to an embodiment of the present invention.
Figure 8:
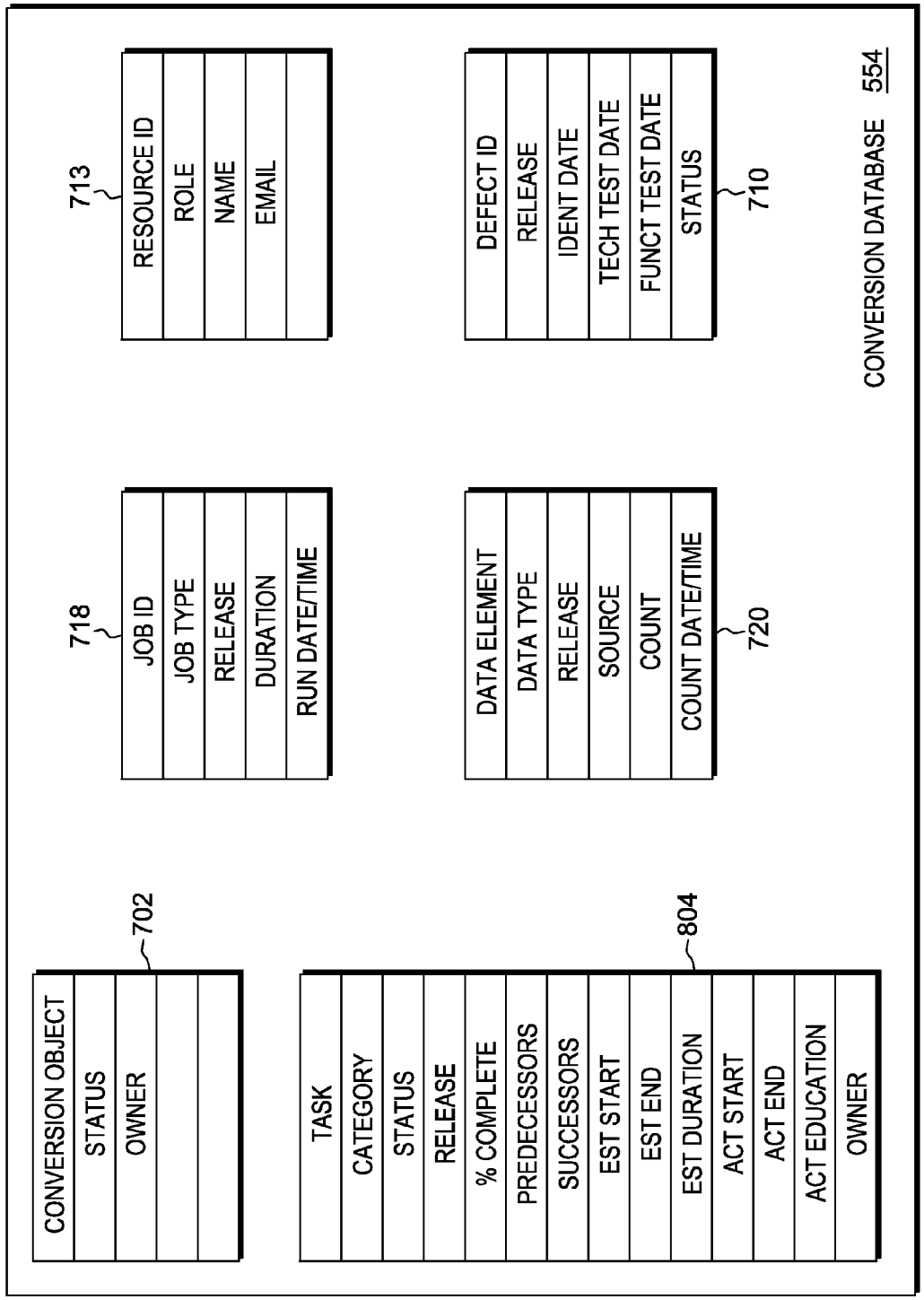
FIG. 8 illustrates a schematic view according to an embodiment of the present invention.

As shown in FIGS. 7 and 8, conversion database 554 has a data model shown by example that includes: conversion object table 702; process stream table 704; sub-process table 706; test scenario table 708; defect id table 710; design task tables 712a to 712n (task tables are also represented by generic task table 804 in FIG. 8); development task tables 714a to 714n; execution task tables 716a to 716n; job id table 718; data element table 720; and resource id table 713. The task blocks are in stacks since the stacks represent multiple types of tasks. For example, development tasks in this embodiment include development of ETL code, technical unit testing, functional unit testing, and so on. FIG. 8 represents examples of key attributes for some of the elements in FIG. 7. They are linked as shown by example in FIG. 7.

Figure 9:
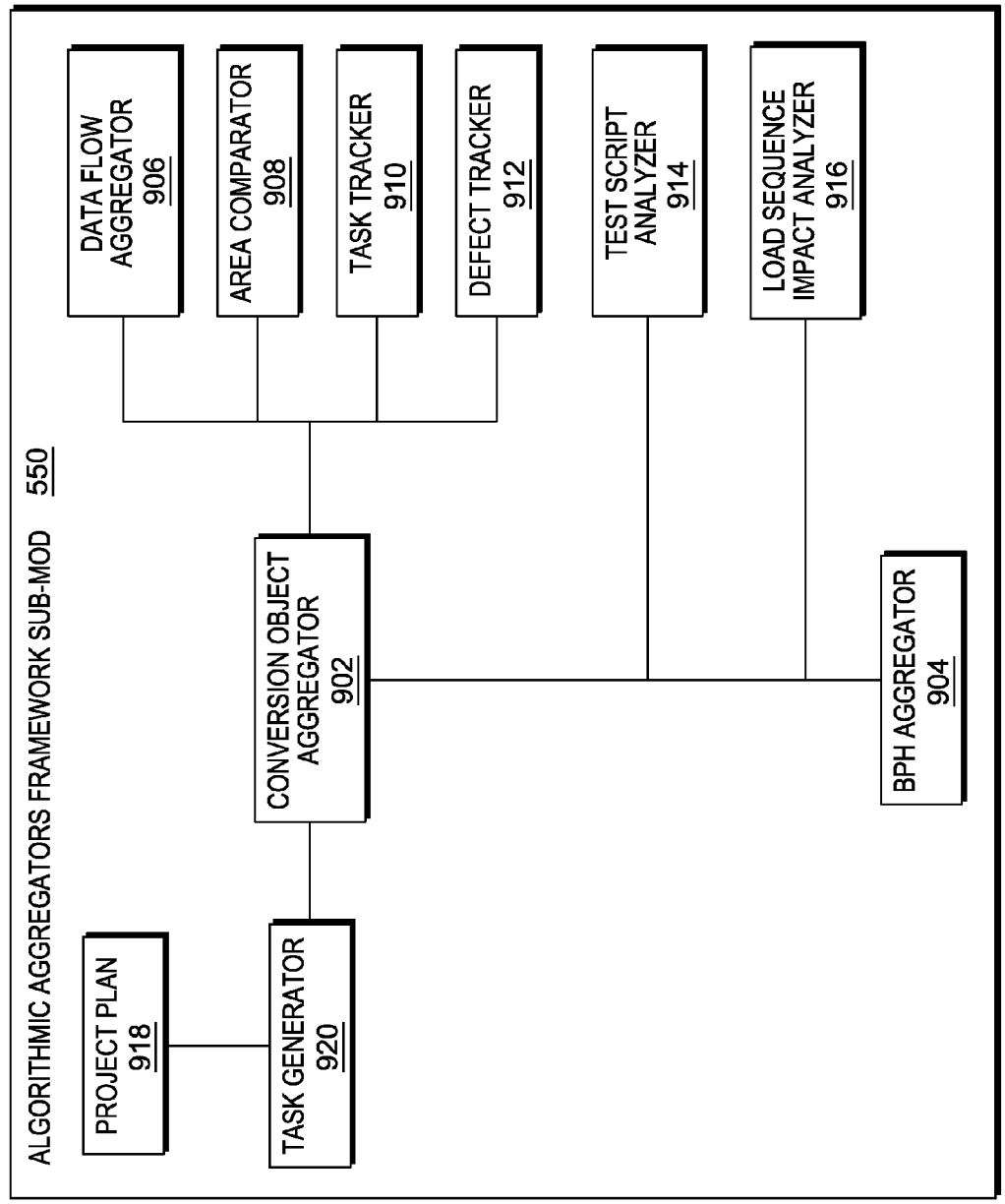
FIG. 9 illustrates a schematic view according to an embodiment of the present invention.

As shown in FIG. 9, algorithmic aggregators framework sub-mod 550 includes: conversion object aggregator 902; business process hierarchy (BPH) aggregator 904; data flow aggregator 906; area comparator 908; task tracker 910; defect tracker 912 (note: defect tracker 518 in FIG. 5 is the defect tracking application that the information pullers connect to in order to pull defect information into the conversion dashboard, whereas defect tracker 912 is the conversion dashboard's representation of the defect(s) as they relate to each conversion object in scope and impact the project plan); test script analyzer 914; load sequence impact analyzer 916; project plan 918 (note: just as defect trackers are different, so are the project plans; project plan 516 in FIG. 5 represents the project planning tool from which the information is pulled, while project plan 918 is its representation in the conversion dashboard); and task generator 920.

As shown in FIG. 5, first communication path 505 communicates a dashboard display (not separately shown in FIG. 5) that includes conversion metrics and aggregations to dashboard module 506. Dashboard mod 506 includes a display device (not separately shown) for displaying this display in human-readable form for conversion manager worker 510. System 500 makes a dashboard display that is quite helpful to worker 510 in performing her management work, as will be further discussed below.

As further shown in FIG. 5, second communication path 507 communicates task updates and conversion definitions to and/or from conversion UI mod 508. This UI is quite helpful to worker 512 in performing her developer/analyst work, as will be further discussed below.

As further shown in FIG. 5, and as will be further discussed below, third communication paths 515 communicate at least the following to the adapters: (i) source metadata (for example, number of records); (ii) operational metadata; (iii) target process metadata; (iv) target data metadata (for example, number of records); (v) conversion scope data; (vi) conversion dependency data; and (vii) defect status data.

As shown in FIG. 5, information pullers mod 504 collects (through third communication paths 515) data from various information sources, including: (i) ETL technology tool 604, enabling automated source extraction, transformation, and target load, embedded transformation rules, and capture of operational metadata, including run-times and data volumes; (ii) information integration platforms of middleware mod 600, with the capability to define and manage business terms and technical assets, store logical and physical data models, maintain logical source-to-target maps, record data profiling results, and store operational metadata for ETL jobs executed; (iii) project planning tool 516, tracking conversion activities and dependencies, estimated run-times and completion dates, activity ownership, and contingency planning; (iv) custom-built analytic marts (not shown) containing predictive analysis reports measuring data compliance in terms of the target system, post-load validation reports, data quality standardization, matching, and de-duplication efforts, and load attempt results during unit, functional verification, and system integration tests; (v) defect tracking technology 518, holding information about ETL defects, change requests, ownership, and status; (vi) spreadsheet-based reports (not shown) communicating conversion objects in scope for each test iteration, conversion object load dependencies, and analytic data mart report results; (vii) task tracking tools (not shown); and (viii) other sources of operational metadata (not shown). In some embodiments of the present disclosure, information is also collected from one or more of these sources via dashboard mod 506 and/or user interface mod 508.

Conversion database 554 stores, links, and manipulates information pulled from the various information sources.

Algorithmic aggregator framework 550 seamlessly slices and dices the information pulled into the conversion database such as through the following major categories: (i) design; (ii) development; and (iii) execution. A "seam" in this context is, for example, manually viewing operational metadata, storing it in a database or spreadsheet, querying the spreadsheet or database with Structured Query Language (SQL) or macros and exporting reports manually to end users in stripped down spreadsheets or images in presentations.

Configurator framework 556 changes settings within the algorithmic aggregator framework, and includes conversion user interface 508 which provides a mechanism for changes and additional data entry by end user 512.

Alerters 552a to 552n bring attention to situations defined by end users through the configurator framework. In embodiment 500, the alerters provide alerts for: (i) critical milestones missed; and (ii) actual task durations that exceed estimates.

The displays of data conversion dashboard mod 506 and user interface mod 508 provide single-source portals for information display, depending on the user type.

As shown in FIG. 6, data to be migrated flows from conversion data sources 602, through ETL tool 604, to conversion target system 606. In embodiment 500, ETL tool 604 is a middleware conversion database, where data cleansing and harmonization occur (see FIG. 5). Each STG area is a schema grouping a number of tables that belong together, reflecting the source data model(s) 1:1 in the middleware conversion database (in other words, there is a staging area for each source system). These areas are used for: (i) data profiling, to avoid the high input/output load of data profiling negatively impacting the source systems; and (ii) as a pick-up location of the original data by developers for each unit or for each functional test they do during code development. Single ALG area 652 reflects the target model as closely as possible with minimal change. This is to allow all records across all sources to be stored in a common data model, and to facilitate unified cleansing and harmonization logic to be applied consistently to all records across all source systems, thus reducing ETL development costs. Single preload (PLD) area 654 reflects the target model 1:1 and contains fully transformed data for each conversion object. This area is used for predictive analysis reporting. The correlation of source attributes with target attributes is captured in logical source-to-target (LS2T) map 656, which is made available to conversion module 502 (see FIG. 5).

As shown in FIG. 5, system 500 includes inputs from project planning tool 516. Initially, the data project scope is defined and a high-level outline of the plan for completing the project is developed. Following this step, the durations for the various tasks necessary to complete the work are listed and grouped by each data conversion object into a work breakdown structure. The logical dependencies between the data objects and the tasks are defined using the data conversion object dependency planning algorithm (defined below). The dependencies are input from the project plan and modified through UI mod 508. The Dependency Planning Algorithm uses the dependencies to perform what-if and contingency planning as certain objects are brought into and out of scope (due to defects), run times are altered, and so forth. The necessary resources are estimated and allocated to each data object. Once established and agreed, the plan becomes a baseline against which progress will be measured throughout the life of the project. An existing project plan in this embodiment includes all the tasks, dependencies, roles, and durations by each data conversion object. The project plan is loaded into conversion database 554 from project plan mod 516, in this case via comma separated value files exported from the project planning tool. The data conversion objects from the project plan are then linked to a master list of data objects for tracking activities along the lifecycle of each data object.

As shown in FIG. 5, system 500 includes inputs from defect tracking system 518. A defect tracking system is a software application that is designed for defect management in the data conversion testing process. These applications can be used for quality assurance and for tracking of reported defects in data conversion testing. Defect tracking systems are typically integrated with other software project management applications. For example, in a typical SAP project, there are many cycles of integration testing, dry runs, user acceptance testing, regression testing, and cutover testing. Many of these test cycles can occur in parallel depending on the rollout schedule. Testing is performed to ensure that the SAP system as well as integrated third-party packages and interfaces meet the functional and user requirements of the end-to-end business processes. For example, testing may be used to: (i) confirm that converted data is accurate and valid and can be used for subsequent processing within the systems; (ii) confirm the functionality of all of the systems and related processes as agreed upon in the business process procedures and process design documents; (iii) confirm security and authorizations setup; and/or (iv) meet all system-level compliance and validation requirements. For other target systems the number of test cycles and so forth may be different; however, any test cycle might reveal defects. Thus, many defect tracking systems allow users to enter defects and maintain reports that can be exported to spreadsheets and other formats. The data from defect tracking tool 518 is loaded into conversion database 554 via such exports and linked to the master list of data objects. This provides a central place for tracking of the data object loads along with the defects. The status and priority of the defect (for example: simple, medium, high, and critical) provides a valuable input to the planning and execution of data conversion loads.

As shown in FIG. 5, system 500 includes inputs from business data roadmap (BDR)/business process hierarchy (BPH) 558. A BDR is established by collecting business data requirements for each database table attribute and mapping these requirements to the process levels in a BPH. Once a BDR has been constructed (for example as a relational database), it establishes a matrix of all the conversion objects, their data tables, and the attributes of these tables linked to different levels of business processes. BDR/BPH 558 is linked to conversion database 554 to provide the linkage of data objects to business processes. This helps in determining the hierarchal organization of data objects through business processes and the interdependencies of the data objects across these processes.

As shown in FIG. 5, information pullers mod 504 collects useful information about the conversion effort from various information sources. This is done through various means, including, for example, an Open Database Connectivity (ODBC) or a Java Database Connection (JDBC) connection, other application programming interfaces (APIs), file importation, and other similar means. The information pulled includes: (i) operational metadata from middleware mod 600; (ii) project plan details from project plan 516; and (iii) defect statuses from defect management system 518.

FIG. 5 also shows conversion database 554. Conversion database 554 is a relational database, but in other embodiments could be any type of persistent storage mechanism which contains a transactional processing concept and recovery features. Conversion database 554 includes a metadata model with the following features: (i) the capability to store metadata about business processes organized in multilevel business process hierarchies, the business objects used by the business processes in business transactions, and for each business object the associated logical and physical data models for all attributes in all tables; (ii) areas to store key information about the project scope and the dependencies among the business objects (for example, that customer and product information must be loaded into the target before transactional data like sales orders can be loaded); (iii) the ability to store mappings between source and target models, such that with these mappings and the association of tables to business objects to business processes, there is a complete lineage from business processes in the target to the tables in the sources; and (iv) areas to store information about which ETL job is operating on which attributes in which tables, and associated operational ETL job data like execution time, number of rows processed, and so forth (this aspect of the data model is exploited for the automatic discovery of which ETL job is conducting work on which business object).

Configurator framework sub-mod 556 for algorithmic aggregator framework sub-mod 550 takes project plan 516 as an input and makes the high-level project outline with the major process areas accessible for modification and configuration through conversion user interface mod 508. This configurator framework then links project plan data to project data objects and business objects using data from BDR/BPH sub-mod 558, where all the conversion objects (for example, a SAP system as the target, where SAP business objects like Customer, Material, Sales Order, and so forth are the conversion objects) are linked to their respective business processes. By linking the project plan with the BDR and BPH, an overall layout of the project is created from a data point of view, because each conversion object is decomposed into one or multiple tables which contain all the attributes in scope. The BPH is annotated where necessary with logical dependencies (for example, the Sales Order conversion object depends on the Customer and Product conversion objects and can't be loaded before these are loaded). Based on this data, all tasks from design, development, and execution are generated in a tasks tracking tool, stored in conversion database mod 554, and accessed via user interface mod 508. The tasks are then seamlessly grouped into workflows with the project plan information for design tasks, development tasks, and execution tasks.

FIG. 7 shows a partial data model for conversion database 554 by example. Process stream table 704 is at the top of the data hierarchy, such that each process stream may have multiple sub-processes from sub-process table 706 associated with it, and in turn each sub-process may have multiple test scenarios from test scenario table 708 associated with it. Conversion object table 702 is central to organization of the data, with tasks shown here broken down by task type.

FIG. 8 provides details of some of the data fields by example that are contained in some of the data tables in conversion database 554 (logical tables are linked as illustrated in FIG. 7). For instance, conversion object table 702 contains fields for conversion object, status, and owner. One record in this table has conversion object as "Customer Master Conversion," with the status "Ready for Design Approval." Similarly, job id table 718 contains a record with job id "CUSEXT," job type "Data Extraction," release "Test Cycle 1," duration "08:34:23," and run date/time "01/01/2013." A record in data element table 720 is "Customer General Data," "Master Data," "Test Cycle 2," "Stage Environment," "25,042 rows," and "01/01/2013," respectively for each field shown.

Task table 804 is a generic task table, the details of which apply to all the task tables in the data model presented in FIG. 7. For instance, for a given record, the category field could contain "Design," "Development," or "Execution," corresponding to one of the task categories specified in FIG. 7. Depending on the task category, the task field could contain: (i) design tasks, such as "Functional Specification Creation" or "Technical Specification Creation;" (ii) development tasks, such as "Extract Job Creation," "Load Job Creation," "Technical Unit Test," or "Functional Unit Test;" or (iii) execution tasks, such as "Extract Source Data," "Transform Data," "Load Data," or "Validate Data."

As shown in FIG. 9, algorithmic aggregators framework 550 for this embodiment of the present disclosure includes metadata aggregators that aggregate low-level input for the various views. The aggregators relate through conversion objects. For example, project plan 918 contains tasks relating to each conversion object. Each conversion object falls under a business object that makes up the business process hierarchy (BPH). Other aggregators and/or combinations of aggregators are possible.

Conversion object aggregator 902 accumulates individual record counts into instance counts of conversion objects by exploiting the metadata describing which tables belong to which business objects and the relationships between the tables. Data flow aggregator 906 groups the record counts for each table of a conversion object through each stage in the conversion, as necessary for high-level validations. Conversion stages include: (i) source aggregations; (ii) stage aggregations; (iii) alignment aggregations; (iv) preload aggregations; and (v) target aggregations. BPH aggregator 904 accumulates the individual business objects related to the finest-grained process level to a status on the finest-grained process level, and in additional phases aggregates the finest-grained process-level statuses to higher-level process layers. Area comparator 908 accumulates the differences between the record counts per conversion object per area alongside the reason codes for these differences. Defect tracker 912 accesses and assesses defect information by conversion object. Task tracker 910 accesses task information and weighs tasks regarding their complexity and/or build time. Test script analyzer 914 analyzes the impact of an incomplete conversion object on test scripts and scores the impact of a conversion object which is either incomplete from a development perspective and/or has associated defects. Generally speaking, the more often a conversion object is referenced by a business process, the higher the impact score will be. Load sequence impact analyzer 916 weighs the impact of an incomplete conversion object regarding the ability to load data into the target system. Generally speaking, the more often a conversion object is referenced by a business process, the higher the impact score will be.

As mentioned above, the embodiment of the disclosure shown in FIG. 5 includes alerters 550a through 550n. Alerters can send notifications to the conversion manager if certain thresholds are exceeded. Examples of alerts that are sent in this embodiment include: (i) less than 50% of the data is in ALG one week before system integration test cycle 1 (SIT1) is scheduled to start; (ii) less than 75% of the data is in ALG one week before system integration test cycle 2 (SIT2) is scheduled to start; (iii) less than 99% of the data is in ALG one week before system integration test cycle 3 (SIT3) is scheduled to start; (iv) significant difference in STG record counts (>20%) from one integration test cycle to another; and (v) significant difference in run times (>20%) from one integration test cycle to another. Alerts such as these are seamlessly triggered based on information computed by the data movement status algorithm (described below).

Some embodiments of the present disclosure include one or more of various algorithms used in conjunction with the aggregators in the algorithmic aggregators framework. These algorithms compute one or more valuable metrics and insights into the data migration project status. By way of example but not limitation, these algorithms may include: (i) a data movement status algorithm; (ii) a data conversion object dependency planning algorithm; (iii) a test script impact algorithm; (iv) a work flow algorithm; and/or (v) a status update and validator algorithm. Details of these algorithms are given below, in the context of the embodiment of the disclosure shown in FIGS. 5 through 9.

The data movement status algorithm displays operational metadata from the middleware input by conversion object in an organized manner for each execution. Its report is used by managers and analysts for data validation as conversion objects move from source systems through the middleware environment and into the target system. The steps of this exemplary algorithm will be respectively discussed in the following paragraphs.

Step (i): invoke data flow aggregator 906 per conversion object and roll-out cycle id for aggregating: (a) source counts from source tables associated to conversion object and cycle id; (b) STG counts from tables associated to conversion object and cycle id; (c) ALG counts from tables associated to conversion object and cycle id; (d) PLD counts from tables associated to conversion object and cycle id; (e) counts from predictive analysis report mart associated to conversion object and cycle id; (f) target counts from target system tables associated to conversion object and cycle id; (g) run times for ETL jobs from source to STG; (h) run times for ETL jobs from STG to ALG; (i) run times for ETL jobs from ALG to PLD; and (j) run times for ETL jobs from PLD to target.

Step (ii): invoke conversion object aggregator 902 to summarize for conversion object the object instance number for each STG area and create thus the overall conversion object count for STG.

Step (iii): invoke conversion object aggregator 902 to summarize for conversion object the object instance number for ALG by: (a) for number on conversion object instances, determining valid records by aggregated field-level data defects to row-level data defects on tables to conversion object instance data defects; (b) invoking area comparator 908 for STG-ALG to compute if number of records in ALG is accurate by: (1) determining the number of records which are on reject links in ETL jobs and could not be processed (error records); (2) determining the number of records which did not pass the filter from STG to ALG (filtered records); and (3) subtracting from the ALG count the error records and filtered records and comparing this result with the STG count such that if these counts are not equal, an analysis is triggered to find identifiers which are in STG but not in ALG and report on them.

Step (iv): invoke conversion object aggregator 902 to summarize for conversion object the object instance number for PLD by: (a) for number on conversion object instances, determining valid records by aggregated field level data defects to row level data defects on tables to conversion object instance data defects; (b) invoking area comparator 908 for ALG-PLD to compute if the number of records in PLD is accurate by: (1) determining the number of records which are on reject links in ETL jobs and could not be processed (error records); (2) determining the number of records which have been identified as historic data (for example, completed sales orders) and are thus not loaded to target and have therefore been filtered out from ALG to PLD (filtered records); (3) determining the number of non-survivors in the matching process; and (4) subtracting from the PLD count the error records, filtered records, and non-survivor records and comparing this result with the ALG count such that if they are not equal, an analysis is triggered to find identifiers which are in ALG but not in PLD and report on them.

Step (v): invoke area comparator 908 to compare the PLD count with the target count to see if all records have been loaded successfully.

Step (vi): summarize the execution time of all ETL jobs from extraction to load to get the total execution time for the conversion object.

Step (vii) display all counts and execution times in the appropriate segment of a data movement status report, allowing for user input for non-system times.

Step (viii): store this report by conversion object and execution cycle id in conversion database 554.

Figure 10:
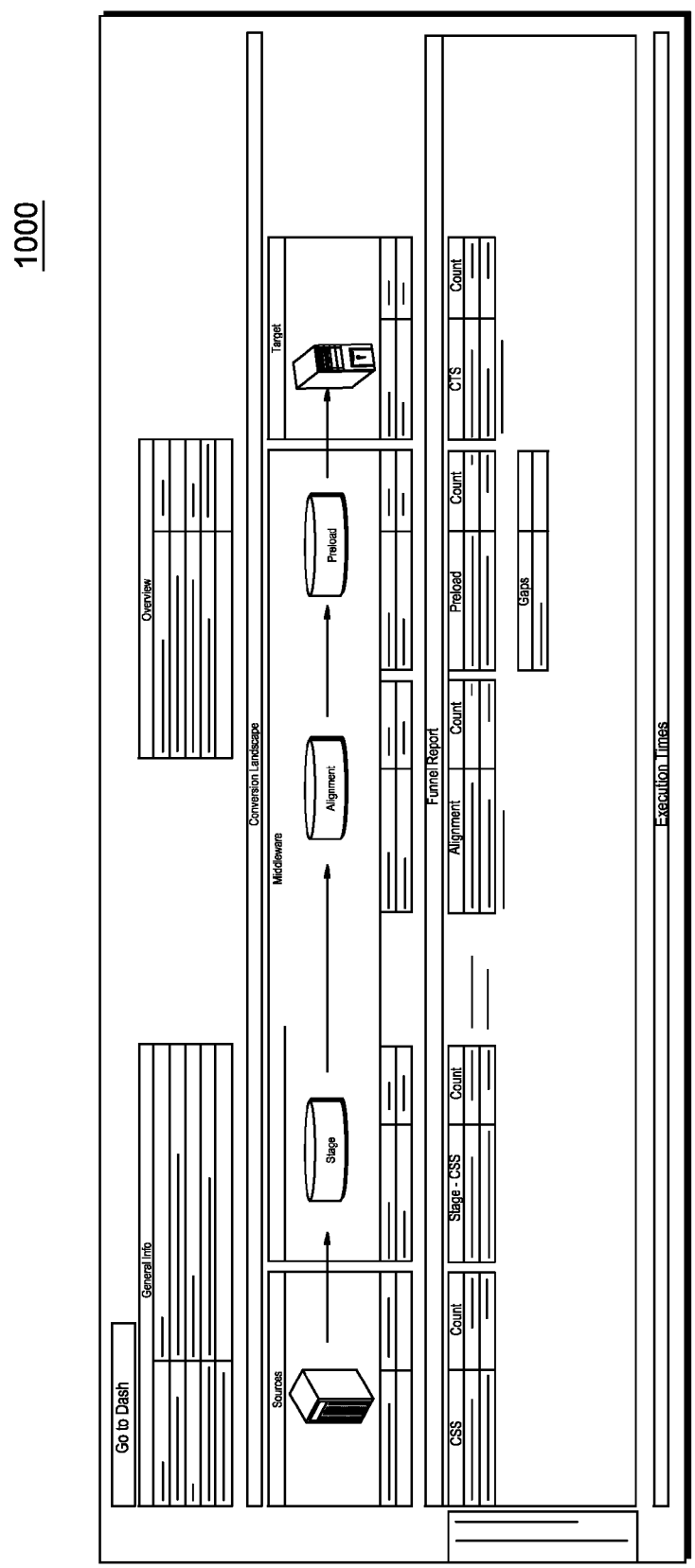
FIG. 10 illustrates a screenshot according to an embodiment of the present invention.

As shown in FIG. 10, screenshot 1000 shows an exemplary display for the data movement status algorithm. This screenshot illustrates some of the metadata within middleware mod 600 (see FIG. 6), including record counts across conversion source systems 602, staging areas 650a to 650n, alignment area 652, preload area 654, and target system 606, for a single conversion object (in this case, a Data Text conversion object) during a single phase of a project. A series flow within one conversion object can be seen. Inter-conversion object dependencies are shown, but not cross-conversion object dependencies.

The data dependency algorithm computes the possible conversion sequence(s) based on dependency details, development/defect statuses and execution times using data pulled from sources including the project plan, defect tracking tool, and middleware environment. Its report is used for preparation before each integration test cycle and cut-over. It is also used for contingency planning, allowing data leads and project managers to toggle the display of conversion objects that are at risk and view dependent objects also at risk, and is used by cut-over managers to view the long-running conversions and plan optimization efforts. The steps of an exemplary data dependency algorithm will be respectively discussed in the following paragraphs.

Step (i): invoke data flow aggregator 906 (see FIG. 9) per conversion object and roll-out cycle id for aggregating: (a) latest conversion object dependencies from project plan data; (b) run times for ETL jobs from source to STG; (c) run times for ETL jobs from STG to ALG; (d) run times for ETL jobs from ALG to PLD; and (e) run times for ETL jobs from PLD to target.

Step (ii): invoke task tracker 910 to get the task status (for example: new, in progress, completed) for each conversion object for each task, and assign a weight to the status of each of these items with respect to completion (note: the tasks have different complexities and thus different time requirements for completion, meaning not every task should contribute the same weight; as part of the middleware configuration, weights can be configured by task type (for example, extract job: 2% weight; matching job: 10% weight); since all conversion objects follow the same architecture and thus the same logical task sequence structure, assigning the weights is only required once per task type; it is not uncommon to see 15-20 major tasks per conversion object).

Step (iii): invoke defect tracker 912 to get defect statuses for each conversion object from defect tool data.

Step (iv): invoke conversion object aggregator 902 to: (a) summarize the execution time of all ETL jobs from extraction to load to get the total execution time for the conversion object; (b) determine for each conversion object the status regarding development by analyzing task status and marking each conversion object as new (no task is started/completed), in progress (some tasks are completed, others are not) or completed (all tasks are finished); (c) optionally invoke the status update and validator algorithm (discussed below) to perform a bit of cross-checking to see if reported status and actual situation are the same and adjust status results accordingly to prevent the usual symptom in projects where everything is reported "green" until the last day where all the "red" status flags are triggered; and (d) determine for each conversion object if a defect is unresolved by analyzing the defect status for any defect associated with this conversion object.

Step (v): invoke BPH aggregator 904, including: (a) for each conversion object, running test script analyzer 914 to determine the impact of a defect across the BPH for conversion objects which are referenced by multiple business processes (for example, master data objects are often referenced); (b) for each conversion object, running load sequence impact analyzer 916 and adjusting weights for conversion objects which are not ready (there is an open defect and/or development is not complete); (c) displaying all objects in, for example, Gantt chart format, omitting (or highlighting) all objects that are not ready for execution (defect pending/development incomplete) and their dependent objects; and (d) aggregating execution time from individual conversion objects to longest path in, for example, the Gantt chart to get total execution time, and displaying that.

Step (vi): allow for user input, including the toggling (on/off) of the display for each object, contingency time allocation, estimated validation time allocation, and cut-over start and end dates.

Figure 11:
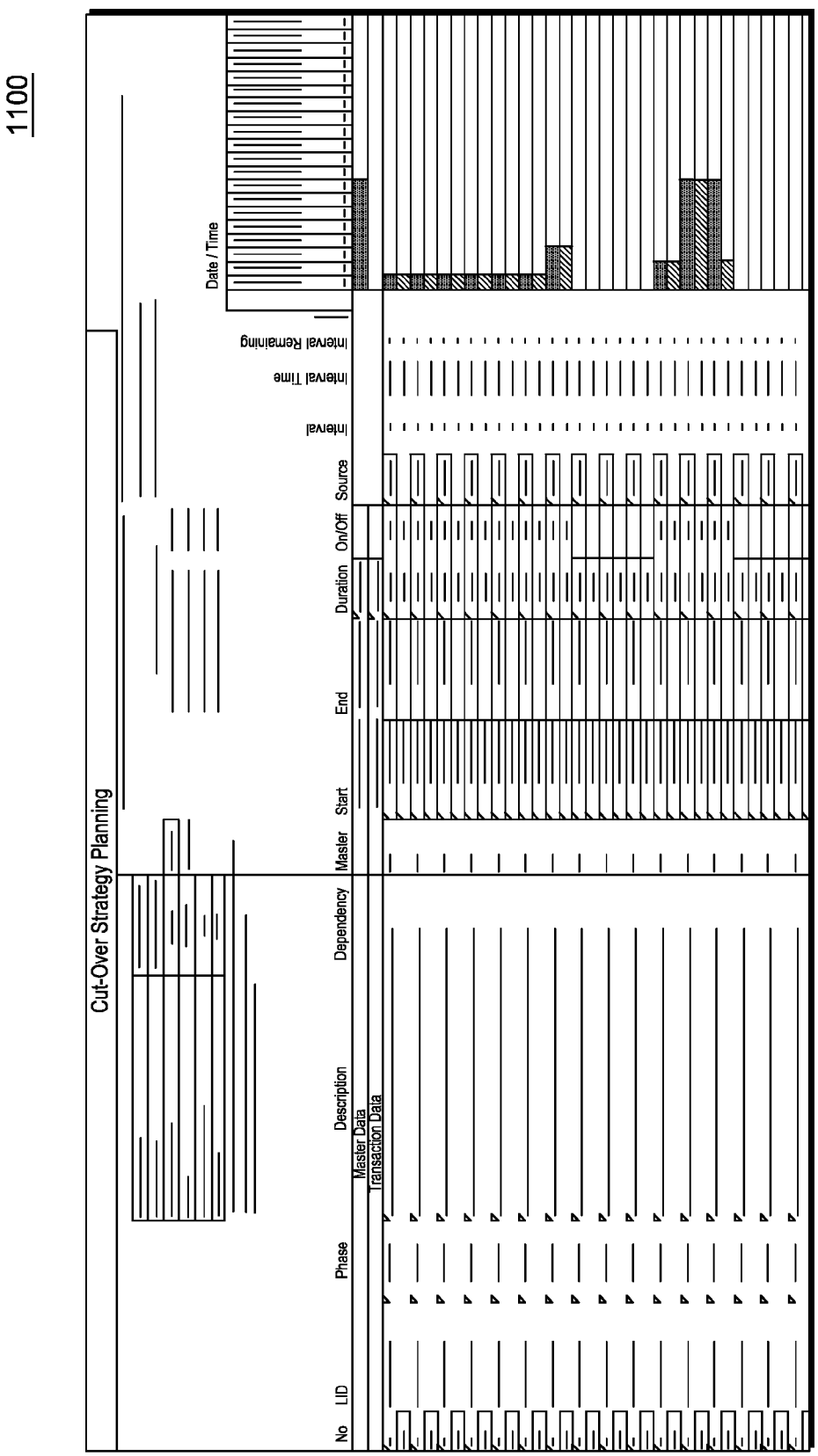
FIG. 11 illustrates a screenshot according to an embodiment of the present invention.

As shown in FIG. 11, screenshot 1100 shows an exemplary display for the data conversion object dependency algorithm. Cross-conversion object dependencies are shown. Each conversion object is identified by a logical id (LID). Durations are called out, and ON/OFF designators are used for "what-if" planning functions. Both series and parallel flows across conversion objects are shown.

With this architecture and these metadata areas and algorithms in mind, a conversion manager can for example see one or more of the following useful metrics: (i) status on progress per business process (all levels); (ii) status on progress per business object in instances of business objects; (iii) status per table in instances of records; (iv) status of total rows across STGs, ALG and PLD, to identify how much data has been processed in each of the areas; (v) status of development, and correlation of development status with record counts in the various areas (for example, zero records in PLD could be due to the fact that the ETL logic to move data from ALG to PLD is not yet developed); and (vi) ability to see why record counts in ALG and PLD are lower than in the STG areas, including reason codes such as non-surviving records which are not moved to PLD, historic data (for example, completed orders) which are not loaded to the target, and rejected records/instances of business objects due to garbage data. Through alerts, the conversion manager can also be notified if certain thresholds are not met by certain dates.

The test script impact algorithm is an extension of the dependency planning algorithm targeting the test scripts affected by conversion objects not in a ready state. The test script impact algorithm is used for test cycle planning by linking test scripts for each process team to their required conversion objects. It assists data managers and process team leads to identify areas of missing data where manual data creation will be necessary before the missing data impacts the test cycle. The steps of an exemplary test script impact algorithm will be respectively discussed in the following paragraphs.

Step (i): invoke data flow aggregator 906 (see FIG. 9) for roll-out cycle id to: (a) get process id for each conversion object through the BPH imported with the BDR; (b) get test script by process from the test plan linked through the BPH/BDR to the project plan; and (c) get conversion object ids for all processes touched by the test script.

Step (ii): invoke defect tracker 912 to get defect statuses for each conversion object id from the defect tracking tool.

Step (iii): invoke conversion object aggregator 902 to determine for each conversion object if a defect is unresolved by analyzing the defect status for any defect associated with that conversion object.

Step (iv) invoke BPH aggregator 904 by, for each conversion object, running test script analyzer 914 to determine the impact of a defect across the BPH for conversion objects which are referenced by multiple business processes (for example, master data objects are often referenced) and displaying in descending order the results to a user regarding affected test scripts and the conversion objects with the largest impact (the conversion object affecting the most test scripts is shown first).

The work flow algorithm supplements the standard work flow process with metadata from conversion database 554 (see FIG. 5). The target users are developers and data analysts who work directly on each conversion object. The work flow algorithm provides developers with all information for their conversion objects in a single user interface. This information includes pending development, bug fix, and execution activities supplemented with operational metadata and detailed documentation. Without this algorithm, developers and analysts would need to pull data from several sources individually, forcing longer lead times and possible disconnect failures.

An exemplary work flow algorithm, with reference to FIGS. 5 and 9, is as follows: (i) invoke the data movement status algorithm; (ii) invoke task tracker 910 per conversion object and roll-out cycle id to get for each conversion object all tasks and their statuses; (iii) invoke defect tracker 912 per conversion object and roll-out cycle id to get the defect status for all defects associated with each conversion object; (iv) get mapping specifications from conversion database 554; (v) get related design documents from conversion database 554; (vi) display all pending tasks for all conversion objects for which a given user is responsible; and (vii) allow for updates to status, ETL code, specifications, testing results, and manual execution times.

The status update and validator algorithm verifies if statuses as reported in task tracking tools are backed by factual evidence. A key ingredient is BDR knowledge on how data tables relate to business objects/processes assigned to a developer. An ETL job repository is scanned for jobs related to each task in the task tracking tool where progress is reported. This is done for each business object in scope and broken down by jobs for STG, ALG, and so on to quickly see exactly how much progress has been made.

Benefits of the data conversion dashboard may include: (i) an integrated view of a conversion object, including development/execution/defect status, run-time operational metadata, data volume moved through middleware and converted, and/or accountable resources and interdependencies with other objects; (ii) early warning indicators if the data-related activities are not on time or are behind in quality targets; (iii) the ability to re-swivel the view by resource to perform workload analysis for each phase of the effort; (iv) the ability to perform contingency actions if any object or activity is delayed or in defect; (v) execution workflow visibility during runtime providing a view for object status and real-time operational metadata such as runtimes and data volume to enable optimized conversion validation; and/or (vi) access to reporting metadata providing a single interface for conversion reports and validations, allowing easier collaboration with business owner counterparts.

The foregoing benefits can be derived through the use of algorithms that aggregate relevant data at various levels of granularity. Exemplary algorithms include: (i) a data movement status algorithm, which compiles data validation information as conversion objects move from source systems, through the middleware environment and into the target system; (ii) a data conversion object dependency planning algorithm, developing dependency information useful for cycle preparation and contingency planning, allowing data leads to toggle the view of conversion objects that are at risk and understand the impacts, as well as allowing cut-over managers to view the long-running conversions and plan optimization efforts; (iii) a test script impact algorithm, facilitating test cycle planning by linking test scripts for each process team to their required conversion objects and identifying areas missing data where manual data creation will be necessary to support a given test cycle; and (iv) a workflow status algorithm, providing developers with all information for their conversion objects in a single view, which could include pending development, bug fix, and execution activities supplemented with operational metadata and detailed documentation, and without which developers and analysts would need to pull data from several sources individually, forcing longer lead times and possible disconnect failures.

The data movement status algorithm may take as input for its computation data retrieved through a data flow aggregator per deployment phase/area of conversion process/business object. Major computation may then be done through a conversion object aggregator that (i) factors in rows on reject links; (ii) factors in non-survivor records of de-duplication processes, if applicable; (iii) determines data defects; (iv) determines by invoking an area comparator how many records could not be moved between two areas of the conversion process due to data defects (for example, ALG to PLD); (v) determines if the number of conversion object instances in PLD is accurate; (vi) compares after load the number of successfully loaded conversion object instances with the PLD number of objects in the PLD and advises on re-load activities as needed, and/or (vii) collects the execution time of each ETL job and aggregates total time for each conversion object. Output may be written to a conversion database, and can be visualized by the users—primarily those in the management and analyst user roles—to understand the status of a business object during data conversion.

The data conversion object dependency algorithm may take as input for its computation data retrieved through sources such as: (i) a data flow aggregator, for data status; (ii) a task tracker, for status on development/testing tasks; and (iii) a defect tracker, for status per conversion object from a defect tracking tool. A first major computation may then be done through a conversion object aggregator to: (i) collect the execution time of each ETL job and aggregate execution time per conversion object; (ii) determine development status per conversion object based on aggregates on task status; and/or (iii) determine defect status per conversion object. A second major computation may then be done through a BPH aggregator to: (i) determine the impact of defects across all business processes per conversion object by invoking a test script analyzer; (ii) determine the impact of defects on load sequencing by invoking a load sequence impact analyzer; (iii) show impacts on Gantt charts; and/or (iv) add contingency time based on size of conversion object in terms of data volume/complexity and impact scope to determine overall cut-over sequence of all business objects. Output may be written to a conversion database and can be visualized by the users—primarily project managers and data leads—to plan the production cut-over for a data conversion project.

In some embodiments of the present disclosure, the data conversion dashboard integrates the many different facets of a major data migration project through information pullers and aggregators. The dashboard provides a single-source portal for all items data-related, using several user-specific algorithms to provide project leaders and team members with the information required to manage effectively and make informed decisions. It can provide visibility of data failures for each object, end-to-end data tracking, and runtime operational metadata that has been pulled and aggregated as part of these algorithms. The focus is on the data that the business processes require in order to execute within an ERP system, and on reporting the status of information integration efforts during data integration implementations for target systems like SAP via a computer-implemented method to determine data movement status by business object by business process area by deployment phase tied together with aggregators and algorithms. This process is the responsibility of architects and conversion specialists in the data management discipline and is very technical in nature.

In some embodiments of the present disclosure, a framework for aggregation is provided for future enhancements. This algorithmic aggregator framework allows seamless "slicing and dicing" of the information pulled into a data conversion dashboard database or other information repository. Metadata aggregators aggregate low-level input for the various views. These could include a conversion object aggregator, a data flow aggregator, a business process hierarchy (BPH) aggregator, an area comparator, and various run-time aggregators. (It should be noted that the area comparator is more than a comparison of record counts, because it identifies conversion object (business object) load success which is composed of a relationship model between several tables. The relationships within each conversion object are defined through the data conversion object dependency planning algorithm. Data movement status is derived by understanding the makeup of each conversion object and then invoking the area comparator to identify and communicate gaps at this aggregated level. This gives project managers a meaningful metric.) Alerters that send notifications to the conversion manager if certain thresholds are exceeded may also be included. A configurator framework may also be included. All tasks from design, development, and execution can be generated in a tasks tracking tool. Together with the project plan information, the tasks can then be seamlessly grouped in workflows for design tasks, development tasks, and execution tasks.

Information Integration ETL functions extract operational metadata (duration, status, record counts, etc.) from the ETL framework and organize it in a logical manner, such as by conversion object.

End-to-end execution time is, for first time runs, project planned time. For each subsequent run, it is the previous actual time.

What is claimed is:

1. A computer implemented method for processing information related to an extract-transform-load (ETL) data migration including a plurality of business objects, the method comprising:
    aggregating, by a data flow aggregator portion of an algorithmic aggregator framework, operational metadata produced by information integration ETL functions;
    aggregating, for each business object of the plurality of business objects and by a conversion object aggregator of the algorithmic aggregator framework, a set of metric(s) relating to data conversion performed in the scope of the ETL data migration;
    determining, by an area comparator of the algorithmic aggregator framework, a difference between a number of business object instances successfully loaded and a number of business object instances which have been at least attempted to be loaded;
    projecting a projected end-to-end execution time for the ETL data migration on a by business object by business object basis based on at least one of the following: project planned time and/or historical data related to previous ETL data migration jobs; and
    creating a dashboard display data set that corresponds to a dashboard display, with the dashboard display including a human understandable visual indication of each of the following with respect to at least one business object of the plurality of business objects: the operational metadata produced by information integration ETL functions, the a set of metric(s) relating to data conversion performed in the scope of the ETL data migration, the difference between a number of business object instances successfully loaded and a number of business object instances which have been at least attempted to be loaded, and the projected end-to-end execution time for the ETL data migration.

2. The method of claim 1, further comprising:
    determining, by one or more processors, records and/or instances of business objects that cannot be moved between any two areas of interest involved in the ETL data migration process by determining: records on reject links in ETL processes; records selected for elimination from the data migration process in response to the records being determined to be duplicates of other records, and/or records filtered out of the data migration process for other reasons;
    in response to determining the records and/or the instances of business objects that cannot be moved between the two areas of interest involved in the ETL data migration process, adjusting area record counts and/or business object instance counts; and
    comparing the adjusted counts between the two areas of interest.

3. The method of claim 1, further comprising:
    determining a total number of instances of business objects entering a data conversion process across all sources by linking data objects to business processes; and
    reducing the total number of instances of business objects entering the data conversion process across all sources based on duplicate records selected for elimination from the data migration process to yield a reduced number of instances; and
    wherein the dashboard display further includes a human understandable visual indication of the reduced number of instances.

4. The method of claim 1, further comprising:
    determining business object instances affected by data defects by connecting fields to records to conversion objects to business objects via a business process hierarchy;
    wherein the dashboard display further includes a human understandable visual indication of the business object instances affected by data defects.

5. The method of claim 1, further comprising:
    determining an average end-to-end processing time for each instance of a business object on a target system from the instances of business objects which have been loaded during test runs;
    wherein the dashboard display further includes a human understandable visual indication of the average end-to-end processing time for each instance of a business object on a target system from the instances of business objects which have been loaded during test runs.

6. The method of claim 1, further comprising:
    determining data movement status by the business object, a business process area, or a deployment phase;

wherein the dashboard display further includes a human understandable visual indication of the data movement status.

7. A computer program product for processing information related to an extract-transform-load (ETL) data migration including a plurality of business objects, the computer program product comprising a non-transitory computer readable storage medium having stored thereon:
first program instructions programmed to aggregate, by a data flow aggregator portion of an algorithmic aggregator framework, operational metadata produced by information integration ETL functions;
second program instructions programmed to aggregate, for each business object of the plurality of business objects and by a conversion object aggregator of the algorithmic aggregator framework, a set of metric(s) relating to data conversion performed in the scope of the ETL data migration;
third program instructions programmed to determine, by an area comparator of the algorithmic aggregator framework, a difference between a number of business object instances successfully loaded and a number of business object instances which have been at least attempted to be loaded;
fourth program instructions programmed to project a projected end-to-end execution time for the ETL data migration on a by business object by business object basis based on at least one of the following: project planned time and/or historical data related to previous ETL data migration jobs; and
fifth program instructions programmed to create a dashboard display data set that corresponds to a dashboard display, with the dashboard display including a human understandable visual indication of each of the following with respect to at least one business object of the plurality of business objects: the operational metadata produced by information integration ETL functions, the a set of metric(s) relating to data conversion performed in the scope of the ETL data migration, the difference between a number of business object instances successfully loaded and a number of business object instances which have been at least attempted to be loaded, and the projected end-to-end execution time for the ETL data migration.

8. A computer system for processing information related to an extract-transform-load (ETL) data migration including a plurality of business objects, the computer system comprising:
a processor(s) set; and
a non-transitory computer readable storage medium;
wherein:
the processor set is structured, located, connected and/or programmed to run program instructions stored on the non-transitory computer readable storage medium; and
the program instructions include:
first program instructions programmed to aggregate, by a data flow aggregator portion of an algorithmic aggregator framework, operational metadata produced by information integration ETL functions,
second program instructions programmed to aggregate, for each business object of the plurality of business objects and by a conversion object aggregator of the algorithmic aggregator framework, a set of metric(s) relating to data conversion performed in the scope of the ETL data migration,
third program instructions programmed to determine, by an area comparator of the algorithmic aggregator framework, a difference between a number of business object instances successfully loaded and a number of business object instances which have been at least attempted to be loaded,
fourth program instructions programmed to project a projected end-to-end execution time for the ETL data migration on a by business object by business object basis based on at least one of the following: project planned time and/or historical data related to previous ETL data migration jobs, and
fifth program instructions programmed to create a dashboard display data set that corresponds to a dashboard display, with the dashboard display including a human understandable visual indication of each of the following with respect to at least one business object of the plurality of business objects: the operational metadata produced by information integration ETL functions, the a set of metric(s) relating to data conversion performed in the scope of the ETL data migration, the difference between a number of business object instances successfully loaded and a number of business object instances which have been at least attempted to be loaded, and the projected end-to-end execution time for the ETL data migration.

9. The system of claim 8, wherein the non-transitory computer readable storage medium has further stored thereon:
sixth program instructions programmed to determine, by one or more processors, records and/or instances of business objects that cannot be moved between any two areas of interest involved in the ETL data migration process by determining: records on reject links in ETL processes; records selected for elimination from the data migration process in response to the records being determined to be duplicates of other records, and/or records filtered out of the data migration process for other reasons;
seventh program instructions programmed to, in response to determining the records and/or the instances of business objects that cannot be moved between the two areas of interest involved in the ETL data migration process, adjust area record counts and/or business object instance counts; and
eighth program instructions programmed to compare the adjusted counts between the two areas of interest.

10. The system of claim 8, wherein the non-transitory computer readable storage medium has further stored thereon:
sixth program instructions programmed to determine a total number of instances of business objects entering a data conversion process across all sources by linking data objects to business processes; and
seventh program instructions programmed to reduce the total number of instances of business objects entering the data conversion process across all sources based on duplicate records selected for elimination from the data migration process to yield a reduced number of instances; and
wherein the dashboard display further includes a human understandable visual indication of the reduced number of instances.

11. The system of claim 8, wherein the non-transitory computer readable storage medium has further stored thereon:
sixth program instructions programmed to determine business object instances affected by data defects by connecting fields to records to conversion objects to business objects via a business process hierarchy;

wherein the dashboard display further includes a human understandable visual indication of the business object instances affected by data defects.

12. The system of claim 8, wherein the non-transitory computer readable storage medium has further stored thereon:

sixth program instructions programmed to determine an average end-to-end processing time for each instance of a business object on a target system from the instances of business objects which have been loaded during test runs;

wherein the dashboard display further includes a human understandable visual indication of the average end-to-end processing time for each instance of a business object on a target system from the instances of business objects which have been loaded during test runs.

13. The system of claim 8, wherein the non-transitory computer readable storage medium has further stored thereon:

sixth program instructions programmed to determine data movement status by the business object, a business process area, or a deployment phase;

wherein the dashboard display further includes a human understandable visual indication of the data movement status.

* * * * *